US011677571B2

(12) United States Patent
Best (10) Patent No.: US 11,677,571 B2
(45) Date of Patent: *Jun. 13, 2023

(54) BACKSIDE SECURITY SHIELD

(71) Applicant: Cryptography Research, Inc., Sunnyvale, CA (US)

(72) Inventor: Scott C. Best, Palo Alto, CA (US)

(73) Assignee: Rambus Inc., San Jose, CA (US)

( * ) Notice: Subject to any disclaimer, the term of this patent is extended or adjusted under 35 U.S.C. 154(b) by 954 days.

This patent is subject to a terminal disclaimer.

(21) Appl. No.: 16/466,146

(22) PCT Filed: Nov. 30, 2017

(86) PCT No.: PCT/US2017/063949
§ 371 (c)(1),
(2) Date: Jun. 3, 2019

(87) PCT Pub. No.: WO2018/106509
PCT Pub. Date: Jun. 14, 2018

(65) Prior Publication Data
US 2020/0076622 A1 Mar. 5, 2020

Related U.S. Application Data

(60) Provisional application No. 62/430,178, filed on Dec. 5, 2016.

(51) Int. Cl.
*H04L 9/32* (2006.01)
*G06F 21/73* (2013.01)
*H04L 9/08* (2006.01)

(52) U.S. Cl.
CPC ............ *H04L 9/3278* (2013.01); *G06F 21/73* (2013.01); *H04L 9/0866* (2013.01); *H04L 2209/12* (2013.01)

(58) Field of Classification Search
CPC . H04L 9/0866; H04L 9/3278; H04L 2209/12; G06F 21/316; G06F 21/73;
(Continued)

(56) References Cited

U.S. PATENT DOCUMENTS 7,952,478 B2 5/2011 Bartley et al.
8,198,641 B2 6/2012 Zachariasse
(Continued)

FOREIGN PATENT DOCUMENTS

CN 105374758 A 3/2016
CN 105809065 A 7/2016

OTHER PUBLICATIONS

Suh et al., Physical Unclonable Functions for Device Authentication and Secret Key Generation, ACM, 2007.*
EP Response filed on Jun. 16, 2021 for EP Appln. No. 17877961.7 in Response to the Official Communication Pursuant to Article 94(3) EPC dated Feb. 11, 2021. 21 pages.
JP Office Action dated May 19, 2022 re: JP Appln. No. 2019-529593. 10 pages.
(Continued)

*Primary Examiner* — Minh Dinh
(74) *Attorney, Agent, or Firm* — The Neudeck Law Firm, LLC (57) ABSTRACT

A physically unclonable function circuit (PUF) is used to generate a fingerprint value based on the uniqueness of the physical characteristics (e.g., resistance, capacitance, connectivity, etc.) of a tamper prevention (i.e., shielding) structure that includes through-silicon vias and metallization on the backside of the integrated circuit. The physical characteristics depend on random physical factors introduced during manufacturing. This causes the chip-to-chip variations in these physical characteristics to be unpredictable and uncontrollable which makes more difficult to duplicate, clone, or modify the structure without changing the fingerprint value. By including the through-silicon vias and metallization on the backside of the integrated circuit as part of the PUF, the backside of the chip can be protected from modifications that can be used to help learn the secure cryptographic keys
(Continued)

and/or circumvent the secure cryptographic (or other) circuitry.

20 Claims, 7 Drawing Sheets

(58) Field of Classification Search
CPC .......... G06F 21/75; G06F 21/86; G06F 21/87; G09C 1/00; G06K 19/073
See application file for complete search history.

(56) References Cited

U.S. PATENT DOCUMENTS

| | | | |
|---|---|---|---|
| 8,525,169 | B1 | 9/2013 | Edelstein et al. |
| 8,610,454 | B2 | 12/2013 | Plusquellic et al. |
| 8,971,527 | B2 | 3/2015 | BrightSky et al. |
| 2009/0001821 | A1* | 1/2009 | Walker .................. G06F 21/87 307/413 |
| 2010/0078636 | A1 | 4/2010 | Zachariasse |
| 2011/0254141 | A1* | 10/2011 | Roest .................. G06F 21/73 257/E29.342 |
| 2011/0299678 | A1 | 12/2011 | Deas et al. |
| 2013/0193437 | A1* | 8/2013 | Lisart .................. G06F 21/87 438/510 |
| 2013/0314121 | A1* | 11/2013 | Mougin ................ G06F 21/86 326/8 |
| 2014/0042628 | A1 | 2/2014 | Edelstein et al. |
| 2015/0137380 | A1 | 5/2015 | in't Zandt |
| 2016/0042199 | A1 | 2/2016 | Joharapurkar et al. |
| 2016/0307855 | A1* | 10/2016 | Charbonnier ......... H01L 23/573 |
| 2017/0083459 | A1* | 3/2017 | Riou .................. G06F 12/1466 |

OTHER PUBLICATIONS

EP Response filed on Jan. 12, 2021 in Response to the Extended Search Report dated Jun. 18, 2020 and the Communication Pursuant to Rules 70 (2) and 70a (2) EPC dated Jul. 7, 2020 re: EP Appln. No. 17877961.7. 19 pages.
EP Communication Pursuant to Article 94(3) EPC dated Feb. 11, 2021 re: EP Appln. No. 1787791.7. 6 pages.
Notification Concerning Transmittal of International Preliminary Report on Patentability dated Jun. 20, 2019 re: Int'l Appln. No. PCT/US2017/063949. 8 Pages.
Notification of Transmittal of the International Search Report and the Written Opinion of the International Searching Authority, or the Declaration dated Feb. 7, 2018 re: Int'l Appln. No. PCT/US17/063949. 9 Pages.
Tuyls, Pim et al., "Read-Proof Hardware from Protective Coatings", Book, vol. 4249., 2006, pp. 369-383, 4249.
Boit, C. et al., "From IC Debug to Hardware Security Risk: The Power of Backside Access and Optical Interaction", 2016 IEEE 23rd International Symposium on the Physical and Failure Analysis of Integrated Circuits (IPFA), IEEE, Jul. 18, 2016, p. 365-369, 5 pages.
EP Extended European Search Report dated Jun. 18, 2020 re: EP Appln. No. 17877961.7. 10 Pages.
CN Office Action dated Apr. 12, 2022 re: CN Appln. No. 201780068273.1. 9 pages. (w/Translation).
IN First Examination Report dated Aug. 16, 2021 re: IN Appln. No. 201917010524. 7 pages.
JP Office Action dated Sep. 22, 2021 re: JP Appln. No. 2019-529593. 12 pages. (w/Translation).
CN Office Action dated Oct. 17, 2022 re: CN Appln. No. 201780068273.1. 5 pages. (w/Translation).

* cited by examiner

BACKSIDE SECURITY SHIELD

DETAILED DESCRIPTION OF THE EMBODIMENTS

Many electronic devices (e.g., cell phones, tablets, set-top boxes, etc.) use integrated circuits that have secure cryptographic keys and secure cryptographic circuitry. These keys and circuitry may be used, for example, to secure data on the device, to secure communication, and/or to authenticate the device. It is desirable to protect the keys and/or other information used by the device from disclosure (thereby protecting the data on the device, preventing unauthorized use, etc.)

When an attacker has physical access to the integrated circuit (e.g., by purchasing a device), attacks designed to learn the secure cryptographic keys and/or circumvent the secure cryptographic circuitry can be carried out by modifying the chip in some manner. A chip may be modified for the purposed of these attacks using, for example, a focused ion beam (FIB) workstation. A FIB machine can cut tracks in a chip's metallization layer, deposit new metal tracks, deposit new isolation layers, remove material (e.g., bulk silicon) to facilitate probing of circuits and signals, implant ions to change the doping of an area of silicon, and build conductors to structures in the lower layers of the chip. One or more of these types of modifications can be used to help learn the secure cryptographic keys and/or circumvent the secure circuitry.

In an embodiment, a physically unclonable function circuit (PUF) is used to generate a fingerprint value based on the uniqueness of the physical characteristics (e.g., resistance, capacitance, connectivity, etc.) of a tamper prevention (i.e., shielding) structure that includes through-silicon vias and metallization on the backside of the integrated circuit. The physical characteristics depend on random physical factors introduced during manufacturing. This causes the chip-to-chip variations in these physical characteristics to be unpredictable and uncontrollable which makes it virtually impossible to duplicate, clone, or modify the structure without changing the fingerprint value. Thus, by including the through-silicon vias and metallization on the backside of the integrated circuit as part of the PUF, the backside of the chip can be protected from modifications and/or observations that can be used to help learn the secure cryptographic keys and/or circumvent the secure circuitry.

Figure 1:
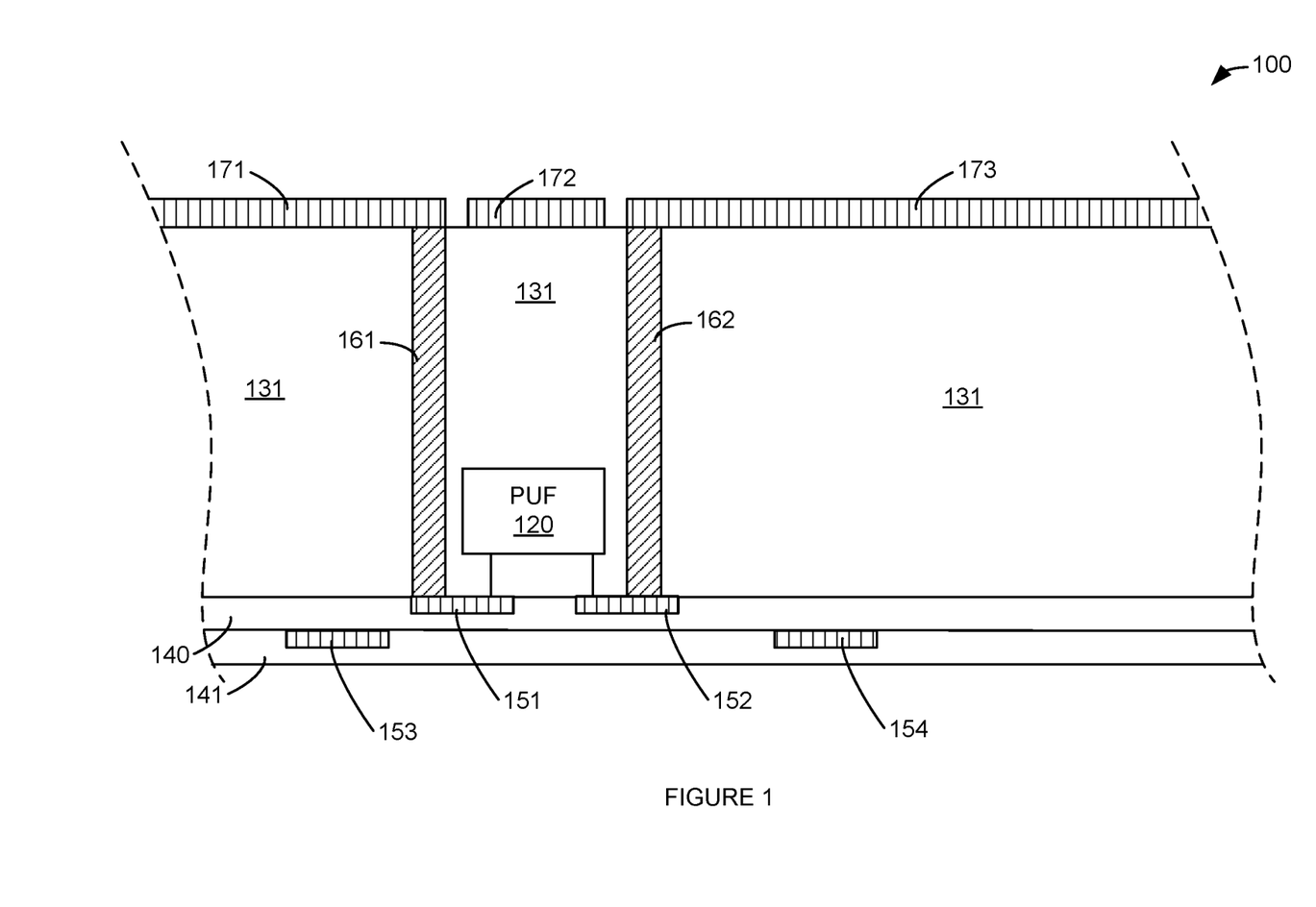
FIG. 1 is an illustration of a security shielded integrated circuit die with through-silicon vias.

FIG. 1 is an illustration of a security shielded integrated circuit die with through-silicon vias. In FIG. 1, integrated circuit die 100 includes physically unclonable function circuitry (PUF) 120, substrate 131, passivation layer 140, passivation layer 141, backside metal layer structure 171, backside metal layer structure 172, backside metal layer structure 173, front side metal layer structure 151, front side metal layer structure 152, front side metal layer structure 153, front side metal layer structure 154, through-silicon via (TSV) 161, and TSV 162. PUF circuitry 120 is illustrated as being integrated with substrate 131.

TSV 161 is illustrated as being connected to PUF circuitry 120 via front side metal layer structure 151. TSV 162 is illustrated as being connected to circuitry PUF 120 via front side metal layer structure 152. Passivation layer 140 and passivation layer 141 are illustrated on the side of integrated circuit die 100 that includes PUF circuitry 120 (a.k.a. the 'front' or 'top' side of integrated circuit die 100.) Backside metal layer structure 171, backside metal layer structure 172, and backside metal layer structure 173 are illustrated on the side of integrated circuit die 100 that does not include active circuitry (a.k.a. the 'back' or 'bottom' side of integrated circuit die 100.)

In an embodiment, one or more of TSV's 161-162 are used to establish connectivity between PUF circuitry 120 and one or more of backside metal layer structures 171-173. The one or more of backside metal layer structures 171-173 that are connected to PUF 120 are thereby integrated as part of active PUF circuitry 120. In this way, a modification to the one or more of backside metal layer structures 171-173 that are connected to PUF 120 (e.g., during a FIB attack that targets circuitry via the backside of a chip) would change the PUF value. If the PUF value is used, for example, to scramble or encrypt data stored on the chip (e.g., data stored in an on-chip non-volatile memory), the changing of the PUF value destroys the usability the data stored on the chip.

PUF 120 may rely on different naturally-mismatched physical properties of integrated circuits to produce its outputs. Backside metal layer structures 171-173 can be connected to PUF 120 so that the naturally-mismatched physical properties of backside metal layer structures 171-173 affect the value(s) output by PUF 120. For example, PUF 120 may rely (at least in part) on the slight mismatch of resistances formed by two or more backside metal layer structures 171-173. These small variations in resistance across or between backside metal layer structures 171-173 are used by PUF 120 to determine an output value.

It should be understood that by using backside metal layer structures 171-173 (when appropriately designed and laid out), PUF 120 is more resistant to several types of attacks. These include, but are not limited to photonic emission attacks and FIB attacks. Photonic emission attacks are resisted because the backside metal layer structures 171-173 absorb the near-infrared signals that are typically collected during this type of attack. Thus, removing all or part of a backside metal layer structure 171-173 so that the emissions of a sensitive active circuit on the front side can be observed causes PUF 120's output value to change. This change in the value that PUF 120 outputs can be used to detect the tampering and/or render protected data on integrated circuit 100 unusable/unrecoverable.

Likewise, a FIB attack that modifies a backside metal layer structure 171-173, causes PUF 120's output value to change. If, for example, a hash of the PUF 120 output value is used by integrated circuit 100 to decrypt a secure region of an on-chip non-volatile memory, then a change of a single bit or more of the PUF 120 output value renders the contents of a non-volatile unrecoverable.

In an embodiment, PUF 120 is configured to apply a first electrical stimulus to one or more of backside metal layer structures 171-173. This electrical stimulus is applied through TSV 161. For example, PUF 120 may be configured to apply a supply or other known voltage to one or more of backside metal layer structures 171-173 using TSV 161. PUF 120 is also configured to receive a response by the one or more of backside metal layer structures 171-173 to the first electrical stimulus that is based at least in part on an electrical characteristic of backside metal layer structures 171-173. This response is received using TSV 162. For example, the response backside metal layer structures 171-173 may include a current that flows through a backside metal layer structure 171-173 in response to the supply or other known voltage that is (or was) applied to one or more of backside metal layer structures 171-173 using TSV 161. This current may be based at least in part on the resistance (i.e., electrical characteristic) of the one or more backside metal layer structures 171-173.

PUF 120 and backside metal layer structures 171-173 are also configured to, based at least in part on the electrical characteristics of the backside metal layer structures 171-173, output a first fingerprint value when backside metal layer structures 171-173 have not been modified. PUF 120 and backside metal layer structures 171-173 are also configured to, based at least in part on the electrical characteristics of the backside metal layer structures 171-173, output a second fingerprint value, different from the first fingerprint value, when a backside metal layer structure 171-173 have been modified.

In an embodiment, PUF 120 may be further configured such that the first fingerprint value is also based on an electrical characteristic of a front side metal layer (e.g., one of more of front side metal layer structures 151-154.) Thus, PUF 120 may, based on the electrical characteristic of the front side metal layer structures 151-154, output a third fingerprint value that is different from the first fingerprint value when a front side metal layer structure 151-154 has been modified.

In an embodiment, one or more of front side metal layer structures 151-154 and/or backside metal layer structures 171-173 may comprise an anti-tamper mesh. For example, backside metal layer structures 171-173 may be designed and laid out as a mesh of metal lines that are relatively difficult to modify without causing a conductive path to form (or be destroyed) between parts of the mesh. This mesh may also be designed and laid out so that even relatively small modifications to the mesh cause one or more electrical characteristics (e.g., resistance, capacitance, etc.) of the mesh to be changed enough to cause the value output by PUF 120 to change.

Figure 2A:
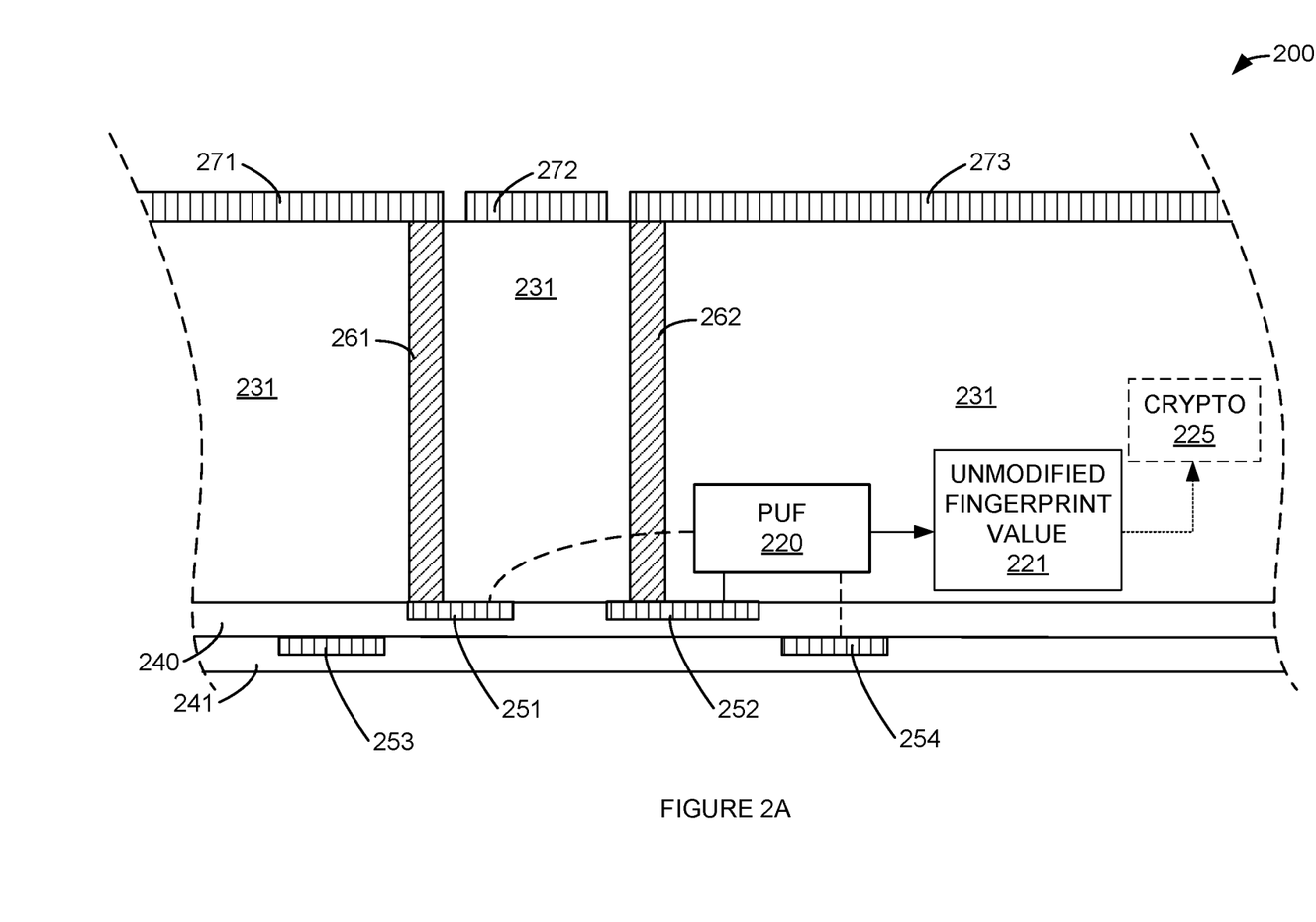
FIG. 2A is an illustration of an integrated circuit having security structures and circuitry.

FIG. 2A is an illustration of an integrated circuit having security structures and circuitry. In FIGS. 2A-2D, integrated circuit die 200 includes a physically unclonable function circuitry (PUF) 220, unmodified fingerprint value 221, optional cryptographic circuitry 225, substrate 231, passivation layer 240, passivation layer 241, backside metal layer structure 271, backside metal layer structure 272, backside metal layer structure 273, front side metal layer structure 251, front side metal layer structure 252, front side metal layer structure 253, front side metal layer structure 254, through-silicon via (TSV) 261, and TSV 262. PUF circuitry 220 and cryptographic circuitry 225 are illustrated as being integrated with substrate 231. Unmodified fingerprint value 221 is illustrated as coming from PUF 220 and being provided to cryptographic circuitry 225. Front side metal layer structure 251 and front side metal layer structure 252 comprise metal that is deposited closest (relative to other routing metal layers) to substrate 231 (a.k.a., metal 1 layer.) Front side metal layer structure 253 and front side metal layer structure 254 comprise metal that is deposited on one or more layers that are farther (relative to the first metal layer—metal 1) from substrate 231 (a.k.a., metal 2, metal 3, etc. layers.)

TSV 261 is, in some embodiments, connected to PUF circuitry 220 via front side metal layer structure 251. TSV 262 is connected to PUF circuitry 220 via front side metal layer structure 252. In some embodiments, PUF circuitry 220 is also connected to front side metal layer structure 254. Passivation layer 240, passivation layer 241, and front side metal structures 251-254 are illustrated on the side of integrated circuit die 200 that includes PUF circuitry 220 (a.k.a. the 'front' or 'top' side of integrated circuit die 200.) Backside metal layer structure 271, backside metal layer structure 272, and backside metal layer structure 273 are illustrated on the side of integrated circuit die 200 that does not include active circuitry (a.k.a. the 'back' or 'bottom' side of integrated circuit die 200.)

In an embodiment, one or more of TSV's 261-262 are used to establish connectivity between PUF circuitry 220 and backside metal layer structures 271-273. The backside metal layer structures 271-273 that are connected to PUF 120 are thereby integrated as part of active PUF circuitry 220. Thus, a modification to any one of backside metal layer structures 271-273 that are connected to PUF 220 (e.g., during a FIB attack) would change the fingerprint value output by PUF 220 to one that is different from unmodified fingerprint value 221. If unmodified fingerprint value 221 is used by cryptographic circuitry 225, to scramble, encrypt, or derive a value used to scramble or encrypt data stored on the chip (e.g., data stored in an on-chip non-volatile memory), changing the fingerprint value output by PUF 220 to one that is different from unmodified fingerprint value 221 destroys the usability of the encrypted data stored on the chip.

PUF 220 relies on different naturally-mismatched physical properties of integrated circuits (and backside metal layer structures 271-273, in particular) to produce unmodified fingerprint value 221. Backside metal layer structures 271-273 are connected to PUF 220 so that the naturally-mismatched physical properties of backside metal layer structures 271-273 affect the value output by PUF 220. For example, PUF 220 may rely (at least in part) on the slight mismatch of resistances formed by two or more backside metal layer structures 271-273 to generate unmodified fingerprint value 221. These small (or large) variations in resistance across or between backside metal layer structures 271-273 are used by PUF 220 to determine unmodified fingerprint value 221. Thus, when these small (or large) variations in resistance across or between backside metal layer structures 271-273 are changed by, for example, a modification to a backside metal layer structure 271-273, the fingerprint value output by PUF is changed 220 to one that is different from unmodified fingerprint value 221.

By using backside metal layer structures 271-273 (when appropriately designed and laid out), as part of PUF 220, integrated circuit 200 is made more resistant to several types of attacks. These include, but are not limited to photonic emission attacks and FIB attacks. Photonic emission attacks are resisted because the backside metal layer structures 271-273 absorb the near-infrared signals that are typically collected during this attack. Thus, removing all or part of a backside metal layer structure 271-273 so that the emissions of a sensitive active circuit on the front side can be observed causes the fingerprint value output by PUF 220 to change to a value that is different from unmodified fingerprint value 221. This change in the fingerprint value output by PUF 220 can be used to detect this tampering and/or render protected data on integrated circuit 200 unusable/unrecoverable. In particular, when the changed fingerprint value output by PUF 220 is input (e.g., as a key or key seed) to cryptographic circuitry 225, unmodified fingerprint value 221 is lost and therefore not available to decrypt information that was encrypted with unmodified fingerprint value 221. Likewise, a FIB attack that modifies a backside metal layer structure 271-273, causes the fingerprint value output by PUF 220 to change to a value that is different from unmodified fingerprint value 221.

In an embodiment, PUF 220 is configured to apply a first electrical stimulus to backside metal layer structures 271-273. This electrical stimulus is applied through TSV 262. For example, PUF 220 may be configured to apply a supply or other known voltage to backside metal layer structures 271-273 using TSV 262. PUF 220 is also configured to receive a response by backside metal layer structures 271-273 to this electrical stimulus. This response is based at least in part on an electrical characteristic of backside metal layer structures 271-273. This response may be received using TSV 261.

Based at least in part on the electrical characteristics of the backside metal layer structures 271-273, PUF 220 outputs unmodified fingerprint value 221 when backside metal layer structures 271-273 have not been modified. Based at least in part on the electrical characteristics of the backside metal layer structures 271-273, PUF 220 outputs a fingerprint value that is different from the unmodified fingerprint value 221 when a backside metal layer structure 271-273 has been modified.

In an embodiment, PUF 220 may be connected to one or more front side metal structures 251-254 such that unmodified fingerprint value 221 is also based on the electrical characteristics of a front side metal layer structure 251-254. Thus, when a front side metal layer structure 251-252 has been modified, PUF 220 outputs a fingerprint value that is different from unmodified fingerprint value 221. This new fingerprint value is based on the electrical characteristics of at least one front side metal layer structures 251-254

In an embodiment, one or more of front side metal layer structures 251-254 and/or backside metal layer structures 271-273 may comprise an anti-tamper mesh. For example, backside metal layer structures 271-273 may be designed and laid out as a mesh of metal lines that are relatively difficult to modify without causing a conductive path to form (or be destroyed) between parts of the mesh. This mesh may also be designed and laid out so that even relatively small modifications to the mesh cause one or more electrical characteristics (e.g., resistance, capacitance, etc.) of the mesh to be changed enough to cause the unmodified fingerprint value 221 output by PUF 220 to change to a different value.

Figure 2B:
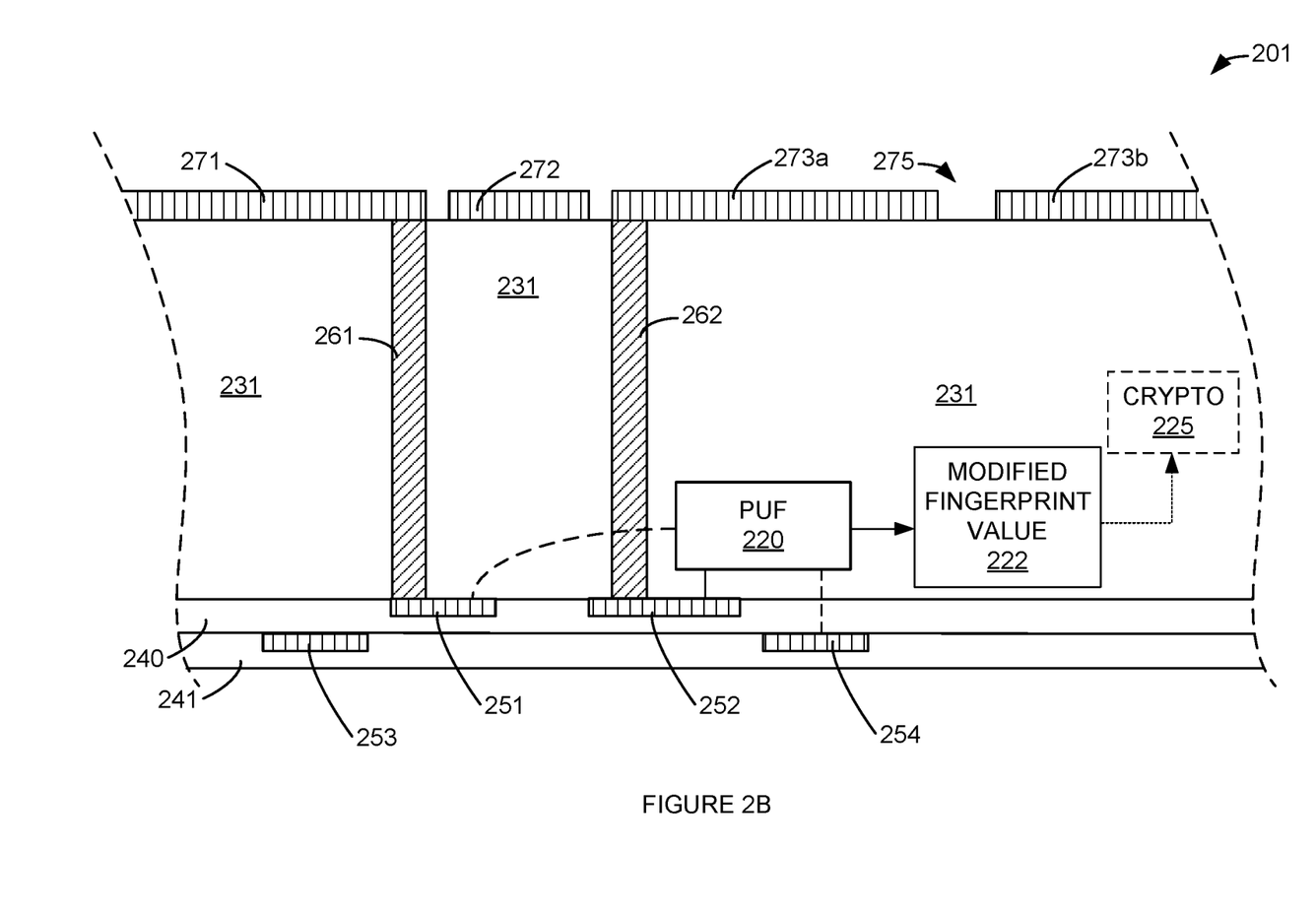
FIG. 2B is an illustration of the integrated circuit where a backside security structure has been modified by removing material.

FIG. 2B is an illustration of the integrated circuit where a backside security structure has been modified by removing material. In FIG. 2B, part of backside metal structure 273 (shown in FIG. 2A) is illustrated as having been opened (i.e., modified—e.g., by a FIB machine) so that (at least for the cross-section shown in FIG. 2B) two separate backside metal structures 273a and 273b are separated by an opening 275. Opening 275 may have been made in order to observe or access circuitry via the backside of integrated circuit 200. In an embodiment, the creation of opening 275 changes the electrical characteristics of the backside metal structure 273 shown in FIG. 2A (e.g., opening 275 changes the resistance, capacitance, connections with, and/or inductance of backside metal structure 273) such that PUF 220 now outputs a modified fingerprint value 222 that is different from unmodified fingerprint value 221.

Figure 2C:
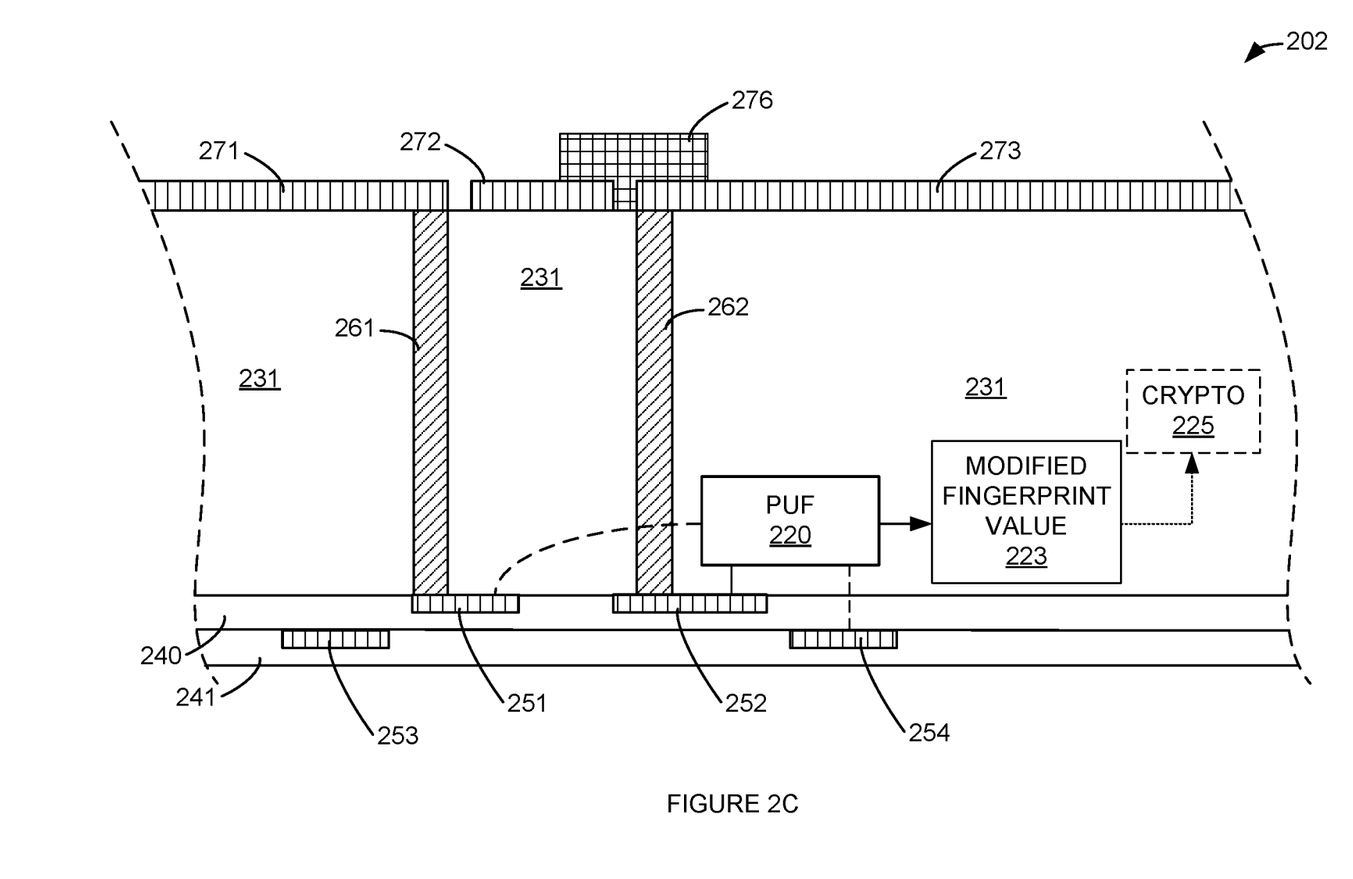
FIG. 2C is an illustration of the integrated circuit where a backside security structure has been modified by adding material.

FIG. 2C is an illustration of the integrated circuit where a backside security structure has been modified by adding material. In FIG. 2C, backside metal structure 273 is illustrated as having been connected to backside metal structure 272 by added material and/or metal 276. Metal 276 may have deposited in order to electrically observe, circumvent, and/or access circuitry via the backside of integrated circuit 200. In an embodiment, the addition of metal 276 changes the electrical characteristics of at least one of backside metal structure 272 and 272 (e.g., metal 276 changes the resistance, capacitance, connections with, and/or inductance of at least one of backside metal structures 272 and 273) such that PUF 220 now outputs a modified fingerprint value 223 that is different from unmodified fingerprint value 221.

Figure 2D:
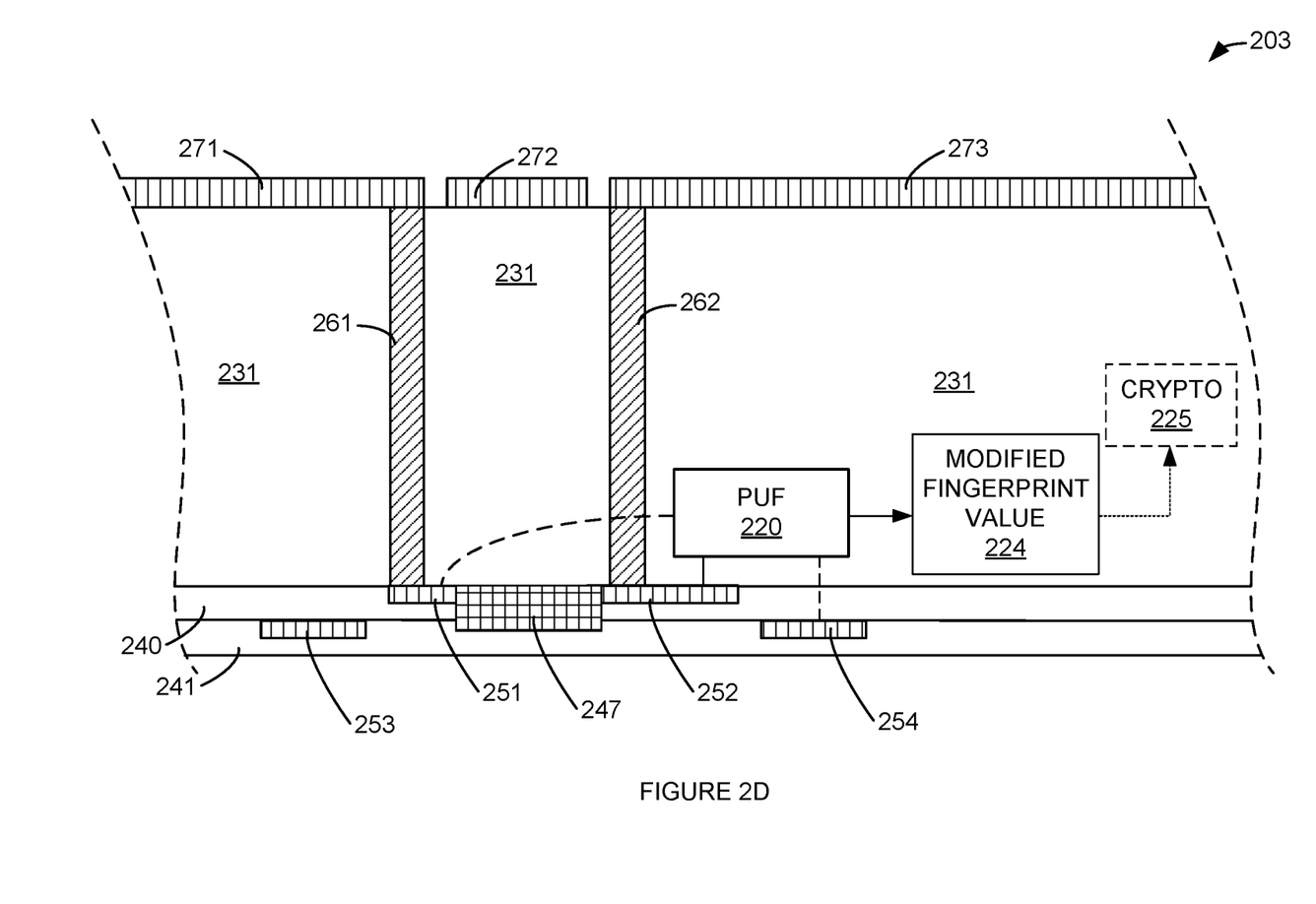
FIG. 2D is an illustration of the integrated circuit where a front side security structure has been modified by adding material.

FIG. 2D is an illustration of the integrated circuit where a front side security structure has been modified by adding material. In FIG. 2D, front side metal structure 251 is illustrated as having been connected to front side metal structure 252 by added material and/or metal 247. Metal 247 may have been deposited in order to electrically observe, circumvent, and/or access circuitry on the front side and/or backside of integrated circuit 200. In an embodiment, the addition of metal 247 changes the electrical characteristics of at least one of front side metal structure 251 and 252 (e.g., metal 247 changes the resistance, capacitance, connections with, and/or inductance of at least one of front side metal structures 251 and 252) such that PUF 220 now outputs a modified fingerprint value 224 that is different from unmodified fingerprint value 221.

Figure 3:
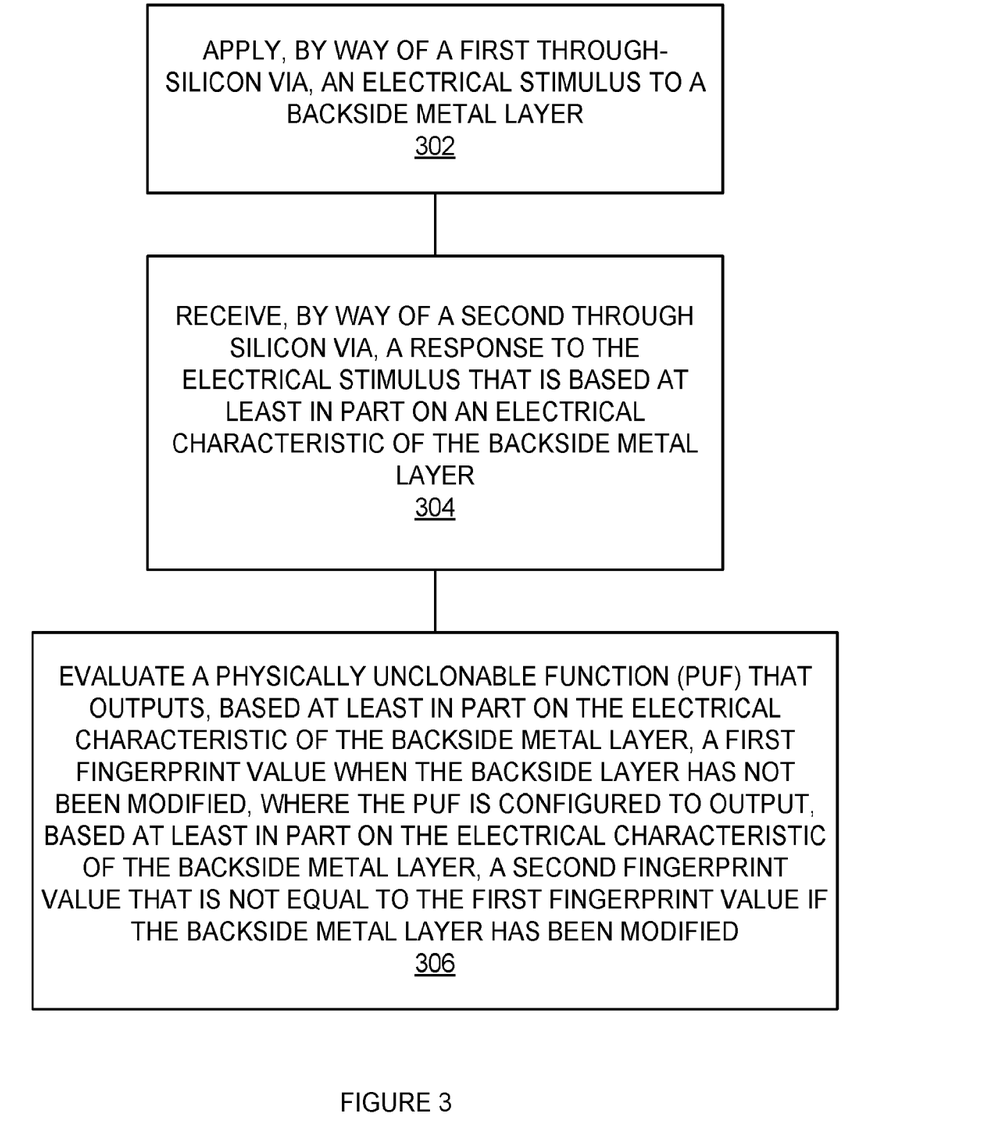
FIG. 3 is a flowchart illustrating a method of detecting modifications to a backside metal layer.

FIG. 3 is a flowchart illustrating a method of detecting modifications to a backside metal layer. The steps in FIG. 3 may be performed by one or more elements of integrated circuit 100 and/or integrated circuit 200. By way of a first through-silicon via, an electrical stimulus is applied to a backside metal layer (302). For example, PUF 220 may apply a voltage and/or current to one or more of backside metal structures 271-273 by way of TSV 262.

By way of a second through-silicon via, a response to the electrical stimulus that is based at least in part on an electrical characteristic of the backside metal layer is received (304). For example, PUF 220 may receive a response to the applied stimulus by way of TSV 261. This response may be based on an electrical characteristic (e.g., one or more of resistance, capacitance, connectivity of, and/or inductance of, at least one of backside metal structures 271-273). This response may be, for example, a voltage or a current.

A physically unclonable function (PUF) outputs, based at least in part on the electrical characteristic of the backside metal layer, a first fingerprint value when the backside metal layer has not been modified, where the PUF is to output, based at least in part of the electrical characteristic of the backside metal layer, a second fingerprint value that is not equal to the first fingerprint value if the backside metal layer has been modified (306). For example, PUF 220 may, based on an electrical characteristic of one or more of backside metal structures 271-273, output unmodified fingerprint value 221 when none of backside metal structures 271-273 have been modified. PUF 220 may also be configured to, based on an electrical characteristic of one or more of backside metal structures 271-273, output a modified fingerprint value 222-223 when at least one of backside metal structures 271-273 have been modified.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of integrated circuit 100, integrated circuit 200, backside metal structures 171-173, backside metal structure 271-273, TSVs 161-162, TSVs 261-262, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 4:
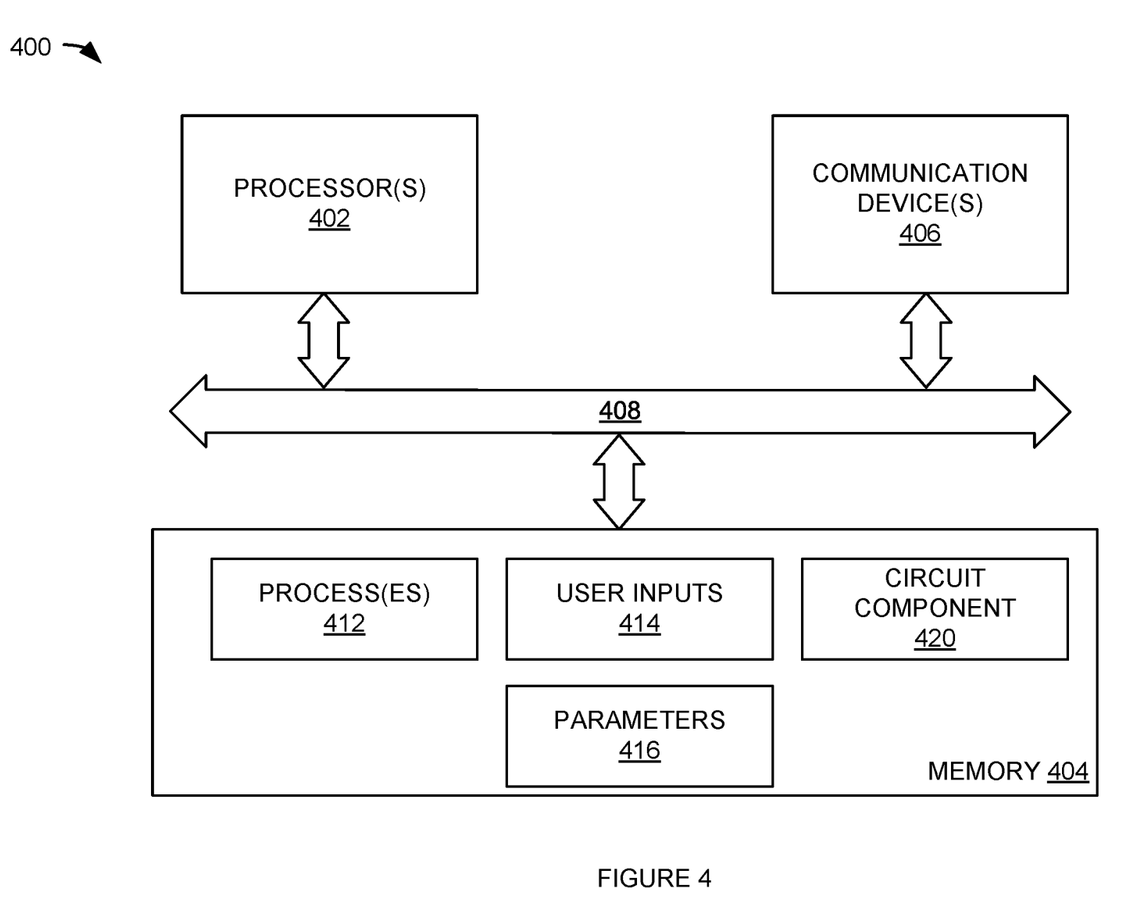
FIG. 4 is an illustration of a computer system.

FIG. 4 is a block diagram illustrating one embodiment of a processing system 400 for including, processing, or generating, a representation of a circuit component 420. Processing system 400 includes one or more processors 402, a memory 404, and one or more communications devices 406. Processors 402, memory 404, and communications devices 406 communicate using any suitable type, number, and/or configuration of wired and/or wireless connections 408.

Processors 402 execute instructions of one or more processes 412 stored in a memory 404 to process and/or generate circuit component 420 responsive to user inputs 414 and parameters 416. Processes 412 may be any suitable electronic design automation (EDA) tool or portion thereof used to design, simulate, analyze, and/or verify electronic circuitry and/or generate photomasks for electronic circuitry. Representation 420 includes data that describes all or portions of integrated circuit 100, integrated circuit 200, and their components, as shown in the Figures.

Representation 420 may include one or more of behavioral, register transfer, logic component, transistor, and layout geometry-level descriptions. Moreover, representation 420 may be stored on storage media or communicated by carrier waves.

Data formats in which representation 420 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 414 may comprise input parameters from a keyboard, mouse, voice recognition interface, microphone and speakers, graphical display, touch screen, or other type of user interface device. This user interface may be distributed among multiple interface devices. Parameters 416 may include specifications and/or characteristics that are input to help define representation 420. For example, parameters 416 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 404 includes any suitable type, number, and/or configuration of non-transitory computer-readable storage media that stores processes 412, user inputs 414, parameters 416, and circuit component 420.

Communications devices 406 include any suitable type, number, and/or configuration of wired and/or wireless devices that transmit information from processing system 400 to another processing or storage system (not shown) and/or receive information from another processing or storage system (not shown). For example, communications devices 406 may transmit circuit component 420 to another system. Communications devices 406 may receive processes 412, user inputs 414, parameters 416, and/or circuit component 420 and cause processes 412, user inputs 414, parameters 416, and/or circuit component 420 to be stored in memory 404.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit die, comprising:
an active circuitry side metal layer;
a backside metal layer comprising a plurality of backside metal layer structures; and,
a physically unclonable function circuit connected to the active circuitry side metal layer and to the backside side metal layer to output a first fingerprint value, a modification of an electrical characteristic of at least one of the plurality of backside metal layer structures to cause the physically unclonable function circuit to output a second fingerprint value that is not equal to the first fingerprint value.

2. The integrated circuit die of claim 1, wherein at least one of the plurality of backside metal layer structures is connected to the physically unclonable function circuit using at least one through-silicon via.

3. The integrated circuit die of claim 2, wherein a modification of an electrical characteristic of the active circuitry side metal layer is to cause the physically unclonable function circuit to output a third fingerprint value that is not equal to the first fingerprint value.

4. The integrated circuit die of claim 2, wherein the integrated circuit is configured to derive a key for a cryptographic function of the integrated circuit at least in part on the first fingerprint value.

5. The integrated circuit die of claim 2, wherein the active circuitry side metal layer comprises a first mesh comprising a plurality of active circuitry side metal lines.

6. The integrated circuit die of claim 5, wherein at least one of the plurality of backside metal layer structures comprises a second mesh comprising a plurality of backside metal lines.

7. The integrated circuit die of claim 1, wherein the first fingerprint value is dependent on an electrical characteristic of at least one through-silicon via.

8. A method of operating an integrated circuit, comprising:
applying, by way of a first at least one through-silicon via, an electrical stimulus to at least one of a plurality of backside metal layer structures of an integrated circuit die;
receiving, by way of a second at least one through silicon via, a response to the electrical stimulus that is based at least in part on an electrical characteristic of the at least one of the plurality of backside metal layer structures; and,
evaluating a physically unclonable function (PUF) that outputs, based at least in part on the electrical characteristic of the at least one of the plurality of backside metal layer structures, a first fingerprint value when the at least one of the plurality of backside metal layer structures has not been modified, the PUF configured to output, based at least in part on the electrical characteristic of the at least one of the plurality of backside metal layer structures, a second fingerprint value that is not equal to the first fingerprint value if the at least one of the plurality of backside metal layer structures has been modified.

9. The method of claim 8, wherein the first fingerprint value is further based on an electrical characteristic of an active circuitry side metal layer.

10. The method of claim 9, wherein the PUF is further configured to output, based at least in part on the electrical characteristic of the active circuitry side metal layer, a third fingerprint value that is not equal to the first fingerprint value if the active circuitry side metal layer has been modified.

11. The method of claim 8, further comprising:
basing a key for a cryptographic function of the integrated circuit on the first fingerprint value.

12. The method of claim 8, wherein the plurality of backside metal layer structures comprises a first mesh comprising a plurality of backside metal lines.

13. The method of claim 12, wherein the PUF is further configured to output, based at least in part on the electrical characteristic of the active circuitry side metal layer, a third fingerprint value that is not equal to the first fingerprint value if the active circuitry side metal layer has been modified.

14. The method of claim 13, wherein the active circuitry side metal layer comprises a second mesh comprising a plurality of active circuitry side metal lines.

15. An integrated circuit, comprising:
a first anti-tamper metal structure of a plurality of anti-tamper metal structures on the back side of a planar integrated circuit die; and,
at least one through-silicon via connecting the first anti-tamper metal structure to active circuitry on an active circuitry side of a planar integrated circuit die, the active circuitry comprising a physically unclonable function circuit configured to output a first fingerprint value based at least in part on the first anti-tamper metal structure being unmodified and to output a second fingerprint value based at least in part on a modification of the first anti-tamper metal structure that changes an electrical characteristic of the first anti-tamper metal structure.

16. The integrated circuit of claim 15, further comprising:
a second anti-tamper metal structure on the active circuitry side.

17. The integrated circuit of claim 16, wherein the physically unclonable function circuit is further configured to output the first fingerprint value based at least in part on the second anti-tamper metal structure being unmodified and to output a third fingerprint value based at least in part on a modification of the second anti-tamper metal structure that changes an electrical characteristic of the second anti-tamper metal structure.

18. The integrated circuit of claim 17, wherein the integrated circuit is configured to base a key for a cryptographic function of the integrated circuit at least in part on the first fingerprint value.

19. The integrated circuit of claim 18, wherein the first anti-tamper metal structure comprises a first mesh comprising a first plurality of metal lines.

20. The integrated circuit of claim 19, wherein the second anti-tamper metal structure comprises a second mesh comprising a second plurality of metal lines.

* * * * *